United States Patent
Dominique et al.

(10) Patent No.: US 7,929,499 B2
(45) Date of Patent: Apr. 19, 2011

(54) METHODS OF MULTIPATH ACQUISITION FOR DEDICATED TRAFFIC CHANNELS

(75) Inventors: Francis Dominique, Rockaway, NJ (US); Hongwei Kong, Denville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 967 days.

(21) Appl. No.: 11/179,576

(22) Filed: Jul. 13, 2005

(65) Prior Publication Data

US 2007/0015541 A1    Jan. 18, 2007

(51) Int. Cl.
*H04B 7/216* (2006.01)
*H04B 1/00* (2006.01)
*H04B 17/00* (2006.01)

(52) U.S. Cl. .................. 370/335; 455/65; 455/67.11

(58) Field of Classification Search .............. 455/561, 455/63.1, 67.11, 501, 446, 447, 65, 504, 455/296, 63.4, 421, 440, 456, 9, 10, 101, 455/278; 370/335, 328, 342; 375/146–150; 333/142; 342/422–445
See application file for complete search history.

(56) References Cited

U.S. PATENT DOCUMENTS

| | | | |
|---|---|---|---|
| 6,356,607 B1 | 3/2002 | Scott et al. | |
| 6,687,512 B1 | 2/2004 | Shinozaki et al. | |
| 6,813,284 B2 | 11/2004 | Vayanos et al. | |
| 6,859,445 B1 | 2/2005 | Moon et al. | |
| 7,215,930 B2 * | 5/2007 | Malladi | 455/67.11 |
| 7,623,484 B2 * | 11/2009 | Dominique et al. | 370/328 |
| 2002/0075946 A1 * | 6/2002 | Seo et al. | 375/148 |
| 2002/0136278 A1 | 9/2002 | Nakamura et al. | |
| 2002/0181561 A1 | 12/2002 | Sano | |
| 2002/0196767 A1 | 12/2002 | Sim | |
| 2003/0053522 A1 | 3/2003 | Hayoun et al. | |
| 2003/0054768 A1 | 3/2003 | Challa et al. | |
| 2003/0081562 A1 | 5/2003 | Iwamatsu et al. | |
| 2003/0112776 A1 | 6/2003 | Brown et al. | |
| 2003/0128678 A1 | 7/2003 | Subrahmanya et al. | |
| 2004/0028013 A1 | 2/2004 | Fitton et al. | |
| 2004/0071193 A1 | 4/2004 | Atarashi et al. | |
| 2004/0077357 A1 | 4/2004 | Nakada | |
| 2004/0240479 A1 | 12/2004 | Bohnhoff | |
| 2005/0002361 A1 | 1/2005 | Dick et al. | |

(Continued)

FOREIGN PATENT DOCUMENTS

| | | |
|---|---|---|
| EP | 1 353 451 | 10/2003 |
| WO | WO 03/041292 | 5/2003 |
| WO | WO 03/061132 | 7/2003 |

OTHER PUBLICATIONS

Qinqing Zhang et al: "Enhanced Power Ramping Scheme for UMTS Random Access Channel" Vehicular Technology Conference, 1999. VTC 1999—Fall. IEEE VTS 50$^{th}$ Amsterdam, Netherlands Sep. 19-22, 1999, Piscataway, NJ, USA, IEEE, US, Sep. 19, 1999, pp. 2631-2635, XP010353383 ISBN: 0-7803-5435-4.

(Continued)

*Primary Examiner* — Eugene Yun
(74) *Attorney, Agent, or Firm* — Harness, Dickey & Pierce

(57) ABSTRACT

In a method of multipath acquisition for a dedicated traffic channel, path positions of the traffic channel that have desired signal energy for processing in a base station receiver may be determined as a function of information contained in a data part and a control part of the traffic channel.

22 Claims, 5 Drawing Sheets

U.S. PATENT DOCUMENTS

| | | | |
|---|---|---|---|
| 2005/0002444 | A1 | 1/2005 | Wei et al. |
| 2005/0002445 | A1 | 1/2005 | Dunyak et al. |
| 2005/0101253 | A1 | 5/2005 | Pajukoski et al. |
| 2006/0013289 | A1 | 1/2006 | Hwang |
| 2006/0088081 | A1 | 4/2006 | Withington et al. |
| 2006/0120438 | A1 | 6/2006 | Reial |
| 2006/0256971 | A1 | 11/2006 | Chong et al. |
| 2007/0195864 | A1* | 8/2007 | Jonsson et al. ............ 375/148 |
| 2008/0075150 | A1 | 3/2008 | Rouphael et al. |

OTHER PUBLICATIONS

International Search Report and Written Opinion in counterpart International Application No. PCT/US2006/027470 dated Dec. 27, 2006.

U.S. Office Action dated Mar. 19, 2009 for U.S. Appl. No. 11/138,362.

U.S. Office Action dated Apr. 17, 2009 for U.S. Appl. No. 11/179,577.

U.S. Office Action dated Sep. 2, 2009 for U.S. Appl. No. 11/188,711.

U.S. Office Action dated Oct. 27, 2009 for U.S. Appl. No. 11/179,577.

U.S. Office Action dated Dec. 16, 2009 for U.S. Appl. No. 11/138,362.

U.S. Office Action dated Jan. 21, 2010 for U.S. Appl. No. 11/188,711.

U.S. Office Action mailed Apr. 30, 2010 for U.S. Appl. No. 11/138,362.

Chinese Office Action dated June 28, 2010 issued in corresponding Application No. CN 2006-80018330.

* cited by examiner

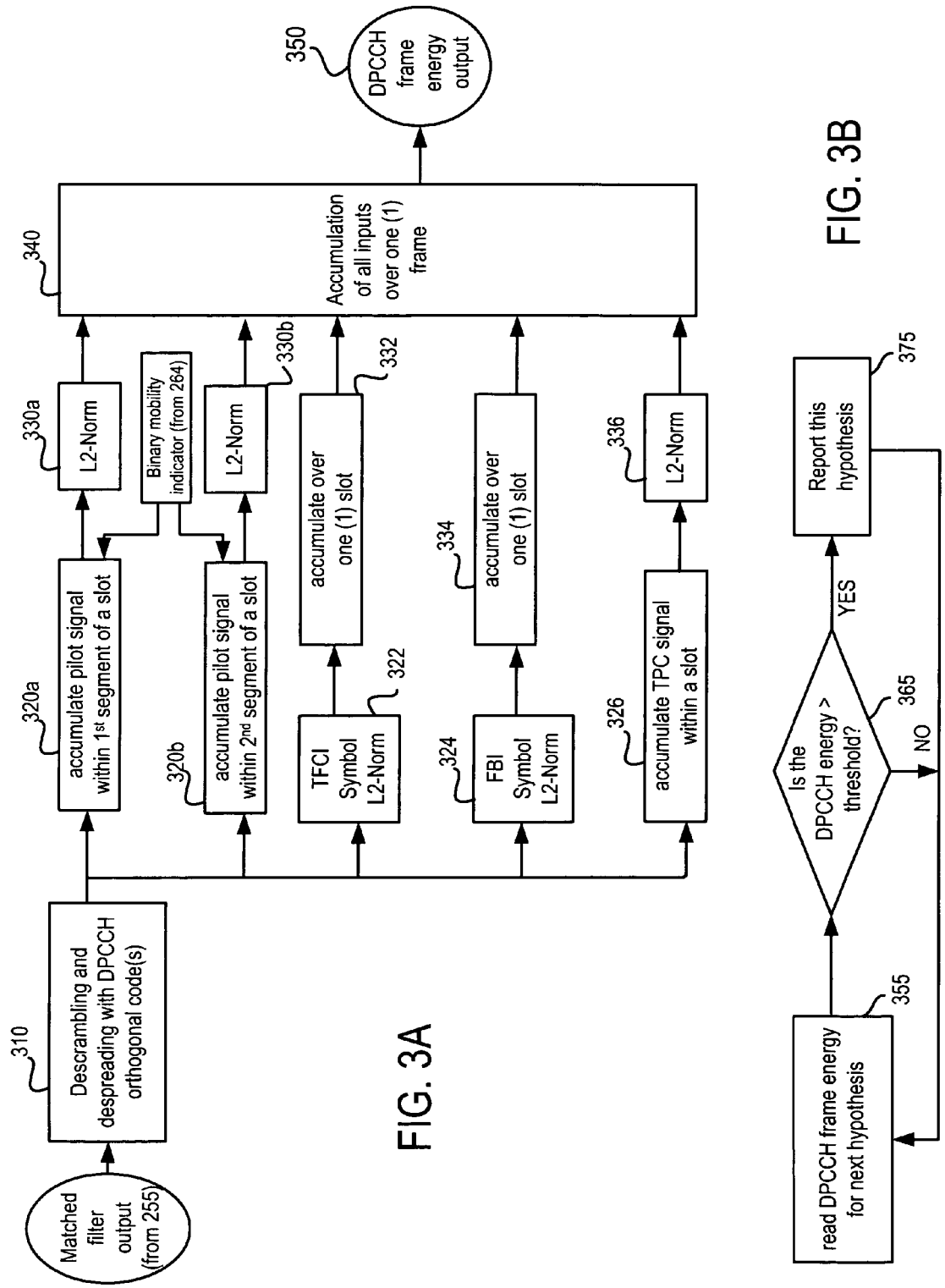

METHODS OF MULTIPATH ACQUISITION FOR DEDICATED TRAFFIC CHANNELS

CROSS-REFERENCE TO RELATED APPLICATIONS

This application is related to co-pending U.S. patent application Ser. No. 11/090,064, filed Mar. 28, 2005 to Dominique et al. and entitled "METHODS OF MULTIPATH ACQUISITION FOR DEDICATED TRAFFIC CHANNELS, and to co-pending U.S. patent application Ser. No. 11/179,577, filed Jul. 13, 2005 to Dominique et al. and entitled "METHODS OF MULTIPATH ACQUISITION FOR DEDICATED TRAFFIC CHANNELS. The entire contents of each of these co-pending U.S. patent applications are hereby incorporated by reference herein.

BACKGROUND OF THE INVENTION

1. Field of the Invention

The present invention relates generally to mulitpath acquisition of dedicated traffic channels in wireless communication systems or networks.

2. Description of the Related Art

FIG. 1 is a frame structure of a dedicated traffic channel for UMTS uplink. Systems or networks designed based on third generation wireless standards such as 3GPP (UMTS) and 3GPP2 (cdma2000) use a dedicated traffic channel in the uplink for communication from mobile users (or user equipment (UE)) to the base station (or Node-B). As shown in FIG. 1, the dedicated uplink traffic channel may include two parts, a data part (Dedicated Physical Data CHannel (DPDCH) in UMTS, known as a Fundamental CHannel/Supplemental CHannel (FCH/SCH) in cdma2000), and a control part (Dedicated Physical Control CHannel (DPCCH) in UMTS, known as a pilot/power control sub-channel in cdma2000).

For the uplink DPCCH in UMTS, there are 15 slots per radio frame (i.e., processing duration corresponding to 15 slots, where the length of the frame is 38,400 chips). One radio frame is 10 ms in duration; thus each slot is 0.667 ms in duration.

The uplink DPCCH may be used to carry control information generated at Layer 1 (the physical layer). Layer 1 control information includes known pilot bits to support channel estimation for coherent detection, transmit power-control (TPC) commands, feedback information (FBI), and an optional transport-format combination indicator (TFCI). The TFCI informs the receiver about the instantaneous transport format combination of the transport channels mapped to the simultaneously transmitted uplink DPDCH radio frame.

Within each slot, the UE thus transmits pilot bits and certain control bits such as TFCI, FBI and TPC bits. Each slot has a total of ten (10) combined pilot bits and control bits. The actual combinations of bit numbers may change and may be controlled by the Radio Network Controller (RNC) at the network, for example. An example configuration may be 5 pilot bits, 2 TFCI bits, 1 FBI bits and 2 TPC bits for one slot.

The pilot bits are known to both the Node-B and the UE; the remaining control bits (TPC, FBI and TFCI) are not known to the base station (Node-B). The number of TPC bits per slot is typically either 1 or 2 bits. If there are two TPC bits in one slot, the values of the 2 bits are identical, i.e., either both TPC bits are 0 or both bits are 1. For 3GPP2 (cdma2000), the frame structure is similar to FIG. 1, although there are no TFCI and FBI bits defined in 3GPP2. For the following discussion, a conventional UMTS transmitter/receiver interface is described.

FIG. 2 is a block diagram of a conventional UMTS uplink transmitter/receiver relationship. Referring to FIG. 2, at the transmitter 200 (of the UE), the Dedicated Traffic Channel/at coding and rate matching block 202. The Dedicated Control Channel (DTCH/DCCH) are coded and merged into one bit stream. This becomes the DPDCH. The DPCCH and the DPDCH are then modulated using BPSK (Binary Phase Shift Keying) at BPSK modulators 205. The DPCCH and the DPDCH are then spread by two different and orthogonal codes (Walsh codes) at 210 and weighted by corresponding gains at 215 to achieve certain power levels. The two channels are then combined (code-division multiplexed) at multiplexer 220. The combined signal may be scrambled and filtered by a shaping filter 225 before modulated to RF (not shown for purposes of clarity) and sent through the propagation channel 230 to the base station (Node-B) receiver 250.

At the Node-B receiver 250, the received signal first passes a matched filter 255. The filtered signal may then be sent to a DPCCH and DPDCH processing block 260 to generate DPDCH soft symbols and a TFCI word for further processing by blocks such as turbo/convolutional decoders (shown in FIG. 2 as a DTCH/DCCH Decoder) to recover the transmitted DTCH/DCCH data. The DPCCH and DPDCH processing block 260 also generates propagation channel measurements such as mobility of the UE. In FIG. 2, for example, this may be shown as a 'binary mobility indicator' 264, which may have a value of '1' to indicate a high mobility user and a value of '0' to indicate a low mobility user. This information may be used to improve the multipath acquisition performance for UEs with different mobility.

The DPCCH and DPDCH processing block 260 thus requires the knowledge of propagation paths, primarily the path positions. This knowledge is produced in the receiver 250 by a multipath acquisition block 265 and is managed by an 'existing and new paths management' block 270. The multipath acquisition block 265 searches a possible range of path positions (also occasionally referred to herein as 'paths' or 'hypotheses') and reports all positions that are determined as having significant signal energy, such as above some given threshold.

The existing and new paths management block 270 further screens the paths reported by the multipath acquisition block 265 and the paths that are already in use in the DPDCH and DPCCH processing block 260. The existing and new paths management block 270 removes repetitive paths and/or weak paths, adds new paths just discovered by the multipath acquisition block 265 and then passes the updated paths' information back to the DPDCH and DPCCH processing block 260. The frequency of the update can be programmable, depending on the design goals. For example, an update interval or frequency may be one DPCCH frame (10 ms). As will be seen below, conventional multipath acquisition uses only the pilot signal information in the DPCCH.

FIGS. 3A and 3B illustrate process flows for multipath acquisition of a dedicated traffic channel. In particular, FIGS. 3A and 3B generally describe the processing in multipath acquisition block 265 of FIG. 2. This processing flow is described in U.S. patent application Ser. No. 11/090,064 by the inventors and entitled "METHODS OF MULTIPATH ACQUISITION FOR DEDICATED TRAFFIC CHANNELS", filed Mar. 28, 2005, hereafter the "'064 application".

Present and future 3GPP/3GPP2 wireless communication systems should be able to support high mobility users. One example application is a user making phone calls from a high-speed train. The record velocity on a commercial high-speed train is the MEGLEV in Shanghai, China, which travels at speeds in excess of 480 Km per hour. For this velocity, the maximum frequency shift for a UMTS system operating in the 2 GHz band is around 2 KHz.

Taking half a cycle of a sinusoid as the coherence interval, then with this frequency shift there is a coherence interval of about 0.25 ms. This presents a substantial challenge to a single pilot signal processing block used in the prior art because the pilot accumulation interval in one slot may exceed the coherence interval of the channel by a substantially large margin. For example, in UMTS, there may be a maximum of 8 pilot symbols per slot, out of the 10 total symbols in that slot. The pilot interval in this case is 0.5333 ms, larger than the 0.25 ms cycle of the frequency shift. In this case, if the pilot signals are still accumulated in the slot, the signal energy is more or less cancelled to zero (considering the accumulation sinusoidal in one cycle, the output is zero). Therefore, a modification is made to provide additional pilot processing blocks so as to more efficiently handle high mobility UEs.

Referring to FIG. 3A, and as described in the '064 application, the pilot energy over a frame is calculated for a specific path position (hypothesis). Initially, the matched filter output from matched filter 255 corresponding to this hypothesis (which is a complex signal) is descrambled and despreaded (310). The pilot pattern is also removed by function 310 as well.

To handle frequency shifts as high as 2 KHz, the pilot signal is bi-sected or divided into two segments (320a, 320b). One segment consists of four (4) pilot symbols, which would have an interval of 0.26667 ms and would barely satisfy the coherence interval for 2 KHz, but nonetheless maximizes the coherence accumulation gain. The other segment has 4 or fewer pilot symbols, with an interval less than or equal to 4 symbols ($\leq 0.26667$ ms) since in 3GPP the largest number of pilot symbols in a slot is 8. The pilot symbols within each segment are accumulated (320a, 320b) before the calculation of their corresponding L2-norms (330a, 330b).

Next, the L2-norms of the outputs from 320a and 320b are formed (330a and 330b). Assuming for example that the complex output signal is z=a+j*b, its L2-norm is given by $L2(z)=a^2+b^2$. The L2-norms of the accumulated pilot signal are further accumulated over a frame interval (340).

As shown in FIG. 3A, the binary mobility indicator 264 from FIG. 2 is used to decide whether a bisect segmentation is needed or not. This preserves the acquisition performance for lower or low mobility users, as lower or low mobility users would not require segmentation on the pilot signals in a slot, and therefore would retain higher coherent accumulation gain. Thus, binary mobility indicator information is used to improve multipath acquisition performance for high mobility users while retain the high performance gain from coherent pilot combining for low mobility users.

In addition to the pilot signal processing at 320a/b and 330a/b, three additional processing block groups are included for processing control information such as output symbols corresponding to TFCI bits (322 and 332), FBI bits (342 and 334) and TPC bits (at 326 and 336).

As TFCI and FBI control bits in a given slot are unknown to the Node-B, output symbols corresponding to these control bits cannot be accumulated (see 332 and 334) prior to the L2-norm calculations at 322 and 332. Otherwise, the signals may cancel one another due to opposite-polarity signs of the symbols. On the other hand, the Node-B knows that if there are multiple TPC bits in one slot, they have to be identical.

Therefore, the output symbols corresponding to the TPC bit(s) in a slot are accumulated (326) prior to being subject to the L2-norm calculation (336), in the same way as the pilot symbols are processed. The L2-norms of the accumulated TFCI, FBI and TPC symbols are further accumulated over the frame interval (340). Since additional energy is collected, the probability that new paths are discovered and existing paths are maintained is increased. Equivalently, to maintain the same probability of detection and or maintain the paths, the UE now can transmit as a lower power level, therefore reducing interference to other users in the cell. The resultant output is the DPCCH frame energy (350).

Referring to FIG. 3B, the DPCCH frame energy for each hypothesis (355) is compared with a fixed pre-defined or given threshold (365). Hypotheses with DPCCH frame energy surpassing the threshold (output of 365 is 'YES') are reported (375) to the existing and new paths management block 270 in FIG. 2 for further processing.

The multipath acquisition process flow described in the '064 application, while configured to more efficiently handle high mobility UEs, uses only the DPCCH signal energy to detect the propagation paths.

SUMMARY OF THE INVENTION

An example embodiment of the present invention is directed to a method of multipath acquisition for a dedicated traffic channel. In the method, path positions of the traffic channel that have desired signal energy for processing in a base station receiver may be determined as a function of information contained in a data part and in a control part of the traffic channel.

Another example embodiment of the present invention is directed to a method of multipath acquisition for a dedicated traffic channel. In the method, path positions of the traffic channel that have desired signal energy for processing in a base station receiver may be determined from demodulated symbols of a data part of the traffic channel that is received by the base station receiver.

Another example embodiment of the present invention is directed to a method of calculating a user frame energy metric of a dedicated uplink traffic channel frame for multipath acquisition of one or more path positions of the frame that are received by a base station receiver. The uplink traffic channel may include a plurality of slots, each given slot including data information of a Dedicated Physical Data CHannel (DPDCH) and control information of a Dedicated Physical Control CHannel (DPCCH). In the method comprising, and for each path position at the receiver, a DPDCH frame energy value may be determined based on DPDCH soft metric symbols resulting from demodulation of the received DPDCH signal. A DPCCH frame energy value may be determined from the control information in the DPCCH, and the DPDCH and DPCCH energy values may be combined to generate the user frame energy metric.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

FIGS. 3A and 3B illustrate process flows for multipath acquisition of a dedicated traffic channel.

DETAILED DESCRIPTION OF THE EXAMPLE EMBODIMENTS

Although the following description relates to multipath acquisition for a dedicated traffic channel in a network based on UMTS technologies and/or related standards, and will be described in this example context, the example methodology may be applicable to any of CDMA (IS95, cdma2000 and various technology variations), various UMTS technologies and/or standards (release 99, R4, R5, R6 and above), GSM, 802.11 and/or related technologies Thus, the example embodiments shown and described herein are meant to be illustrative only and not limiting in any way. As such, various modifications will be apparent to those skilled in the art for application to wireless communication systems or networks based on technologies other than the above, which may be in various stages of development and intended for future replacement of, or use with, the above networks or systems.

As used herein, the term user equipment (UE) may be synonymous to a mobile, mobile station, mobile user, user, subscriber, wireless or access terminal and/or remote station, etc., for example, and may describe a remote user of wireless resources in a wireless communication network. Where used below, the term Node-B is synonymous with base transceiver station, base station, access point, etc. and may describe equipment that provides voice and/or data connectivity between a communication network and one or more mobile stations. Occasionally herein the terms Node-B and base station may be used interchangeably.

As discussed above, the '064 process for multipath acquisition for a dedicated traffic channel uses only the DPCCH signal energy to detect the path positions. However, multipath acquisition performance may be improved if information in both a control part and a data part of the traffic frame is included in the calculation of a frame energy metric.

Accordingly, a revised frame energy metric may be calculated. Instead of calculating only DPCCH signal energy, information from the data part of the traffic channel, e.g., a DPDCH signal, may also be used to calculate a "user frame energy metric" over a given duration that may be used to detect valid path positions (hypotheses). Multipath acquisition performance may be improved and system latency reduced if symbols obtained from demodulation of a DPDCH signal (received with the DPCCH in a frame of the traffic channel) by the Node B is included in the calculation. In this case, the frame energy of the entire received signal, e.g., the user frame energy metric, may be calculated from DPDCH and DPDCH frame energy calculations.

Figure 4A:
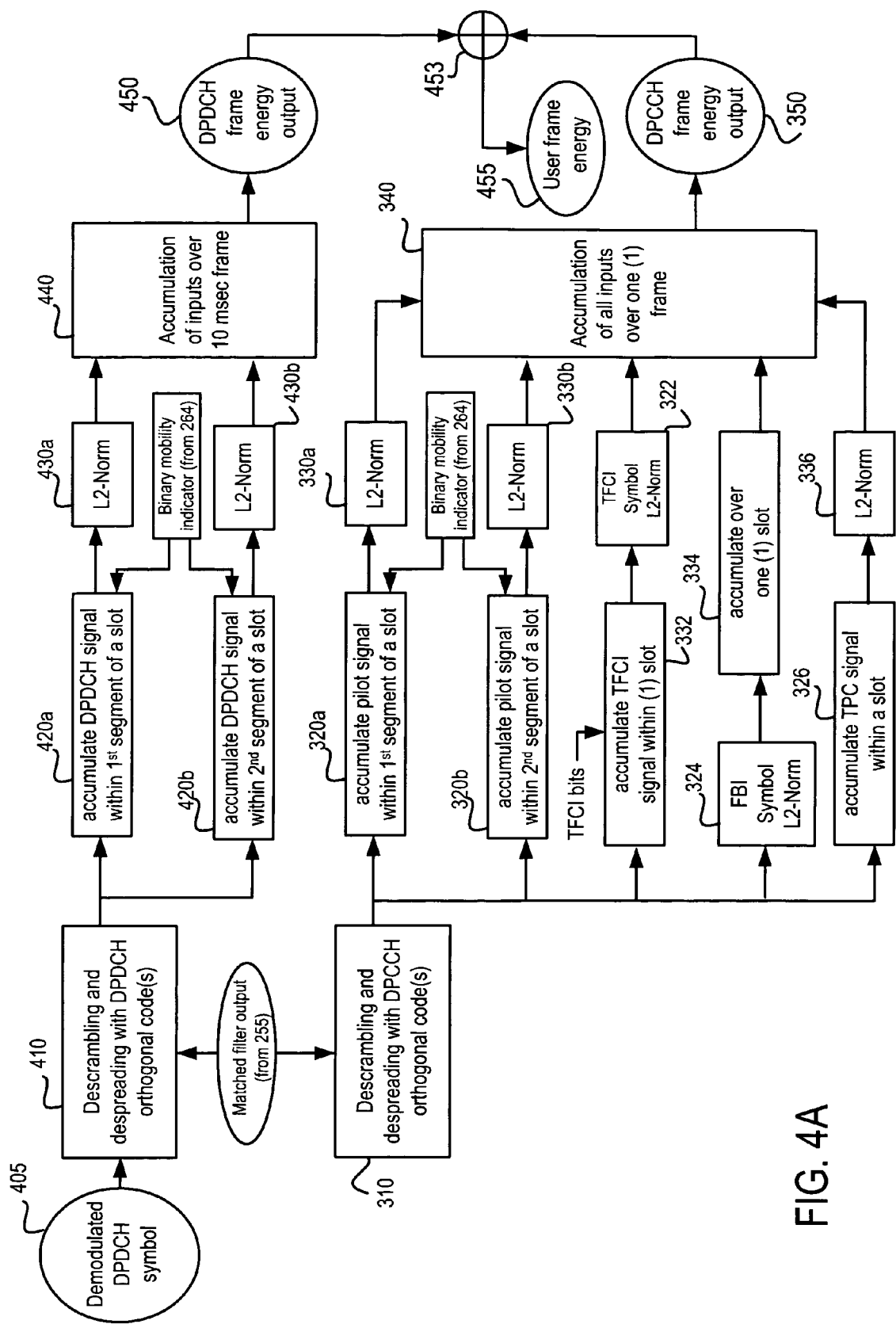
FIGS. 4A and 4B illustrate process flows for multipath acquisition of a dedicated traffic channel in accordance with an example embodiment of the present invention.
Figure 4B:
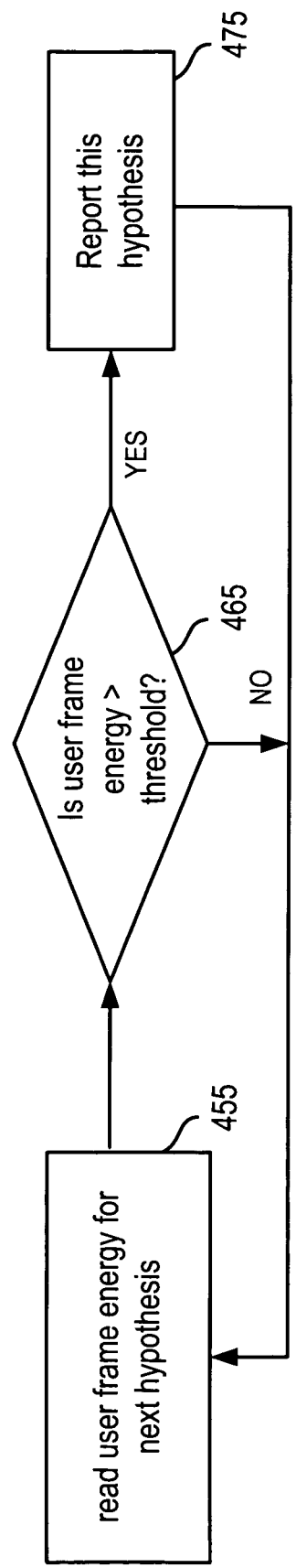

FIGS. 4A and 4B illustrate process flows for multipath acquisition of a dedicated traffic channel in accordance with an example embodiment of the present invention. FIG. 4A illustrates a modification of the multipath acquisition processing flowchart illustrated in FIG. 3A. The hypotheses reporting flowchart in FIG. 4B is a modification from that shown in FIG. 3B.

FIG. 4A illustrates a method of multipath acquisition using DPDCH and DPCCH information. In an example, a user frame energy metric may be calculated as a function of the demodulated DPDCH symbols at the output of the DPCCH and DPDCH processing block 260 in FIG. 2. The demodulation is a simple sign check of each DPDCH soft symbol metric so as to determine the corresponding bit value. For example, temporary decisions on DPDCH bits are made here. The decisions are from block 405 in FIG. 4A and are used in block 410 to remove the data dependency of the DPDCH, therefore allowing the accumulation of segments in block 420a/b.

In general as shown in FIG. 4A, a DPDCH frame energy calculation (at 450) and the DPCCH frame energy calculation (at 350) may be performed at the end of every radio frame. The calculation of the DPCCH frame energy is similar to that shown in FIG. 3A, with the exception of the processing of the TFCI symbols; thus the element number convention is maintained with regard to the DPCCH frame energy calculation for ease of comparison.

Figure 2:
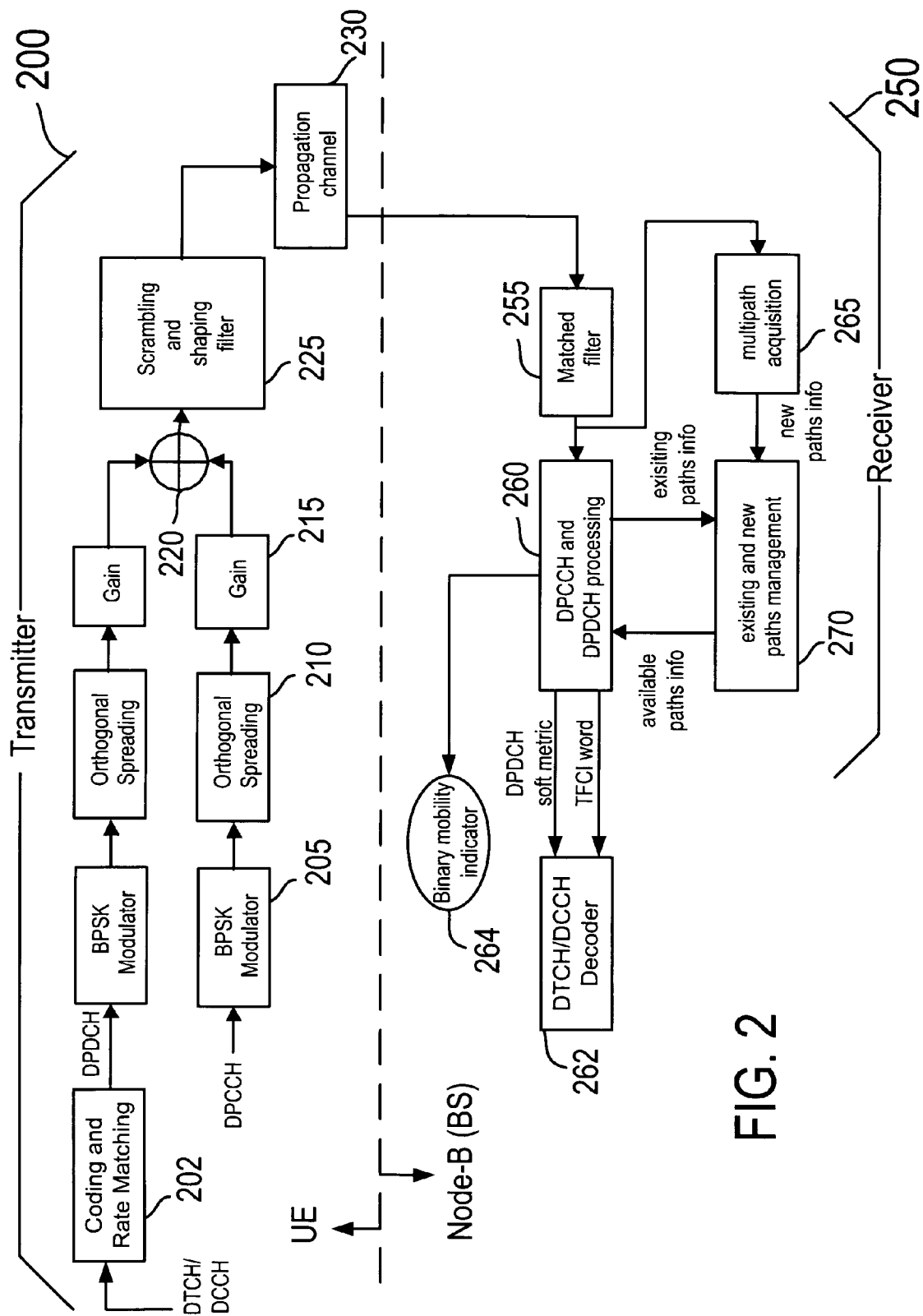
FIG. 2 is a block diagram of a conventional UMTS uplink transmitter/receiver relationship.

Referring to FIG. 2 (output of DPCCH and DPDCH processing block 260) and in FIG. 4A (input to block 332), the TFCI word for that frame is also available at the frame end and therefore can be used to remove the TFCI data-dependency in the TFCI field in the DPCCH, so TFCI symbols in a time slot can first be coherently accumulated at 332 before the L2-Norm calculation at 322. User frame energy 455 may be determined from the combination of DPCCH frame energy and DPDCH frame energy at 453. The user frame energy metric is the metric to be used to detect valid path positions (e.g., hypotheses) of the traffic channel which have desired signal energy for processing in a base station receiver (e.g., Node B receiver 250 of FIG. 2).

Figure 1:
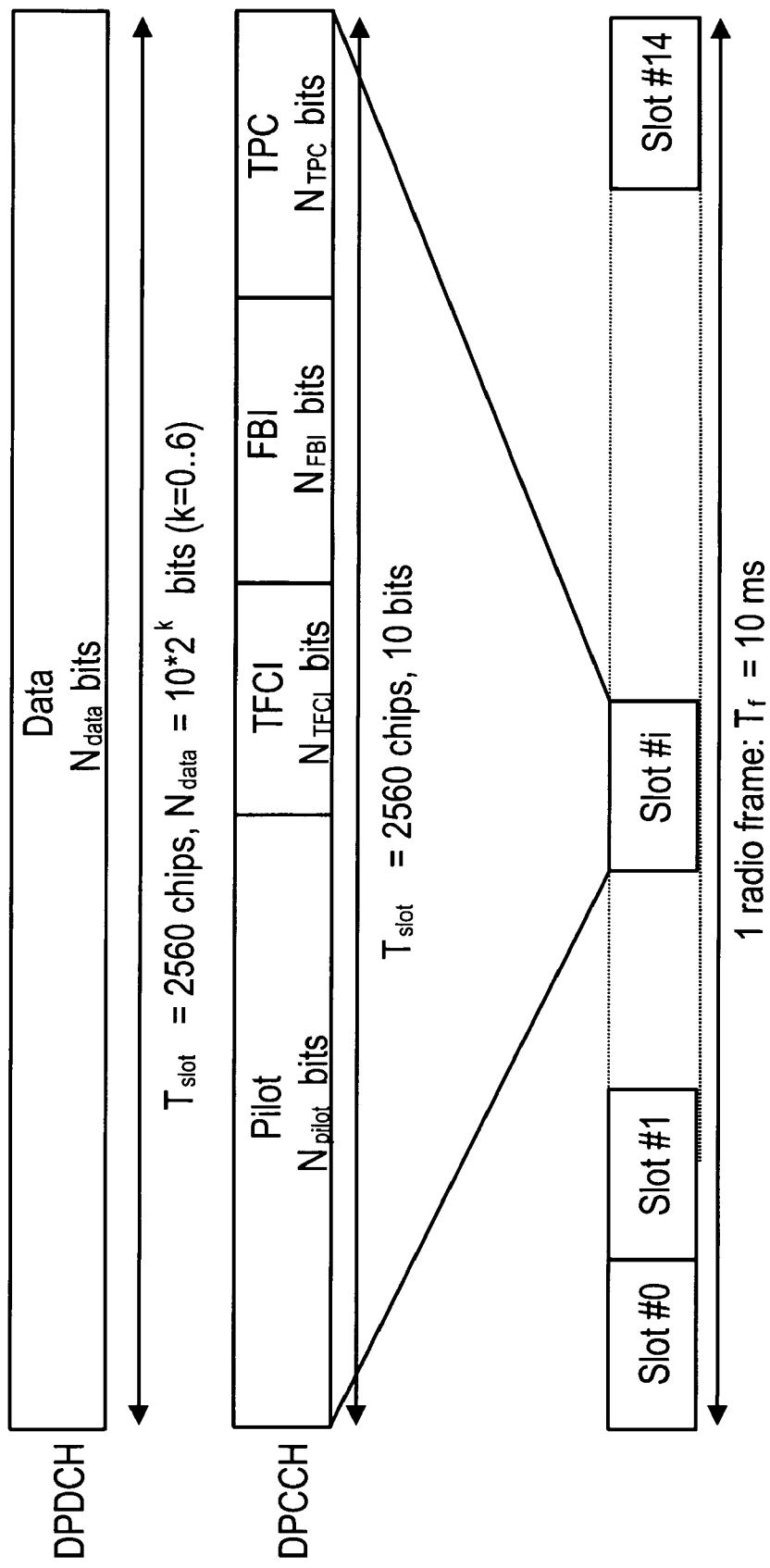
FIG. 1 is a frame structure of a dedicated traffic channel for UMTS uplink.

A further improvement of FIG. 4A is possible by considering TFCI as pilot symbols after the dependency on TFCI bits are removed, since they are known at the time the DPCCH frame energy is calculated. (Referring to FIG. 1, pilot block and TFCI block can be combined into one larger pilot block). In this case blocks 322 and 332 are redundant and can be removed.

As shown in FIG. 4A, the demodulated DPDCH symbols are input (at 405) and used to remove the data-dependency in the DPDCH channel. This is shown in the 'descrambling and despreading with DPDCH orthogonal code block 410. The matched filter output from matched filter 255 corresponding to this hypothesis (e.g., complex signal) is also input to block 410. The 'Binary mobility indicator' (from 264) is used to equally bisect the time slot for the DPDCH signal if the mobility is high. Otherwise there will be no bisecting segmentation (first segment has the full slot length and second segment has zero length).

Functions 420a/b and 430a/b are generally as described with respect to FIG. 3A, thus a detailed explanation is omitted for brevity. The inputs are accumulated (440) over a given duration in order to calculate the DPDCH frame energy output at 450, which in an example represents a 10 msec radio frame.

For the DPCCH frame energy calculation, the processes are similar to FIG. 3A and are not described in detail. As shown in FIG. 4A, the pilot signal is bi-sected into two segments, each segment being accumulated (320a, 320b) before the calculation of their corresponding L2-norms (330a, 330b). The L2-norms of the bisected and accumulated pilot signal segments are further accumulated over a frame interval (340). As discussed above, the binary mobility indicator 264 from FIG. 2 is used to decide whether a bisect segmentation is needed or not, so as to improve multipath acquisition performance for high mobility users while retaining the high performance gain from coherent pilot combining for low mobility users.

Three additional processing block groups are included for processing control information: output symbols corresponding to TFCI bits (322 and 332), FBI bits (342 and 334) and TPC bits (at 326 and 336). As the FBI control bits in a given slot are unknown to the Node-B, output symbols corresponding to these control bits cannot be accumulated (see 334) prior to the L2-norm calculations at 324. Otherwise, the FBI signals may cancel one another due to opposite-polarity signs of the symbols. On the other hand, the Node-B knows that if there are multiple TPC bits in one slot, they have to be identical. Therefore, the output symbols corresponding to the TPC bit(s) in a slot are accumulated (326) prior to being subject to the L2-norm calculation (336), in the same way as the pilot symbols are processed.

Unlike FIG. 3A, since the decoded TFCI word for that frame is also available at the frame end, it can be used to remove the TFCI data-dependency in the TFCI field in the DPCCH. Thus unlike FIG. 3A, the TFCI symbols in a time slot (TFCI word) can first be coherently accumulated at 322 before the L2-Norm calculation at 332. As described above, the TFCI may be considered as pilot signal output symbols after the dependency on TFCI bits have been removed, since they are known at the time the DPCCH frame energy is calculated. The TFCI as pilot output symbols may also be separated into first and second segments, with equal or unequal length, similar to as shown for the pilot signal output symbols in FIG. 4A, or they can be treated together with the pilot symbols as a larger pilot block, and the segmentation will be down on the larger pilot (note that in UMTS uplink, the number of pilot and TFCI bits per slot is always 8, so a bisection on the combined 'pilot+TFCI block' will always be equal length).

The accumulated L2-norms for the TFCI, FBI and TPC symbols may be further accumulated over the frame interval (340) with the accumulated L2 norms of the pilot signal segments. The resultant output is the DPCCH frame energy (350).

Since additional energy is collected, the probability that new paths are discovered and existing paths are maintained may be increased. Equivalently, to maintain the same probability of detection and or maintain the paths, the UE now can transmit as a lower power level, therefore reducing interference to other users in the cell.

FIG. 4B illustrates a hypotheses reporting flow process which executed each 10 ms radio frame. As shown in FIG. 4B, and to preserve the hypothesis reporting frequency, e.g., every 10 ms, the user frame energy metric for each hypothesis (455) is compared with a fixed pre-defined or given threshold (465). Hypotheses with user frame energy surpassing the threshold (output of 465 is 'YES') are reported (475) to the existing and new paths management block 270 in FIG. 2 for further processing. This may be repeated each 10 msec frame until all hypotheses have been examined.

Accordingly, the example method may utilize demodulated DPDCH symbols at a base station receiver in order to calculate a user energy metric for detecting valid path positions of the traffic channel which have desired signal energy for processing in the base station receiver (e.g., Node B receiver 250 of FIG. 2). By using the demodulated DPDCH symbols, the example methodology may reduce the latency of the DPDCH energy, which is typically available only after a maximum TTI (e.g., about every 80 msec in the worst case). In addition, for 3GPP Release 6 (enhanced uplink), due to the use of hybrid ARQ, there may be a substantial probability that the first couple of transmissions result in a CRC check failure, so the latency in the DPDCH signal may also become variable, which is not desirable. By using the demodulated DPDCH bits instead of the decoded ones, this (variable) latency effect may be avoided.

The example methodology described above may be employed for any network based on one or more of UMTS (release 99, R4, R5, R6 and above), and may be adaptable for CDMA (IS95, cdma2000 and various technology variations), GSM, 802.11 and/or related technologies (such as 802.15 and 802.16), including communication systems or networks based on technologies other than the above (such as cdma2000 1X EVDO Rev B and UMTS Release 7), which may be in various stages of development and intended for future replacement of, or use with, the above networks or systems.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A method of multipath acquisition for a dedicated uplink traffic channel, comprising:
   determining a desired signal energy for a given path position by calculating a user energy metric based on a descrambled and despread filtered data part of at least one traffic channel frame; and
   determining path positions of the traffic channel having the desired signal energy for processing in a base station receiver as a function of information contained in a control part and a demodulated data part of the traffic channel.

2. The method of claim 1, wherein
   the information contained in the demodulated data part of the traffic channel includes a Dedicated Physical Data CHannel (DPDCH) signal which is demodulated at the receiver into DPDCH symbols for removing the data-dependency of the DPDCH signal.

3. The method of claim 2, wherein the control part is a Dedicated Physical Control CHannel (DPCCH) which includes control information including one or more of pilot signal bits, one or more transmit power control (TPC) bits, one or more feedback information (FBI) bits, and one or more transport-format combination (TFCI) bits.

4. The method of claim 3, wherein the determining the desired signal energy determining is performed for each frame of the traffic channel.

5. The method of claim 4, wherein determining path positions includes:
   comparing the calculated user frame energy for each given path position to a given threshold, and
   reporting path positions having a user energy metric exceeding the threshold to processing circuitry within the base station receiver.

6. The method of claim 4, wherein calculating the user energy metric for a given path position includes:
   determining a DPDCH frame energy value,
   determining a DPCCH frame energy value, and
   combining the DPDCH and DPCCH energy values to calculate the user frame energy value.

7. The method of claim 4, wherein calculating the user energy metric for each frame of the traffic channel includes
   determining a DPDCH frame energy value based on the demodulated DPDCH symbols,
   determining a DPCCH frame energy value from the control information in the DPCCH, and
   combining the DPDCH and DPCCH energy values to calculate the user frame energy value.

8. The method of claim 6, wherein determining the DPDCH frame energy value for each given path position includes:

descrambling and despreading a filtered DPDCH signal output of the traffic channel frame and using demodulated DPDCH symbols to remove the data dependency of the DPDCH signal, segmenting the DPCCH signal into first output symbols and second output symbols, accumulating the first output symbols in a first given segment of a slot of the frame to output a first accumulated DPDCH signal, accumulating the second output symbols in a second given segment of a slot of the frame to output a second accumulated DPDCH signal, calculating L2 norms for the accumulated DPDCH signals to generate a plurality of input signals, and accumulating the inputs over a given duration to generate the DPDCH frame energy for the given path position.

9. The method of claim 6, wherein determining the DPCCH frame energy value for each given path position includes:

descrambling and despreading a filtered output of the traffic channel frame received by the base station receiver which corresponds to a given path position into a plurality of output symbols corresponding to the control information in the DPCCH, accumulating output symbols corresponding to pilot signal bits within a slot of the frame, output symbols corresponding to TFCI bits which have been decoded in the receiver within a slot of the frame, and output symbols corresponding to TPC bits within a slot of the frame, calculating L2 norms for the accumulated pilot symbols, L2 norms for the accumulated TFCI symbols and L2 norms for the accumulated TPC symbols, calculating L2 norms for output symbols corresponding to FBI bits over a slot of the frame, and accumulating the calculated L2 norms for the FBI output symbols over the slot, wherein each of the accumulated L2 norms for the pilot signal, TFCI signal, FBI signal and TPC signal within a given slot of the frame are further accumulated to generate the DPCCH frame energy value.

10. The method of claim 9, wherein accumulating pilot signal output symbols further includes dividing the pilot signal into two segments, with equal or unequal length, and separately accumulating output symbols corresponding to the given segment, and wherein calculating L2 norms for the accumulated pilot symbols further includes separately calculating L2 norms for the accumulated pilot symbols corresponding to the given segment of the pilot signal.

11. The method of claim 10, wherein whether or not to divide the pilot signal is based on a value of a binary mobility indicator bit which indicates the relative mobility of a user transmitting the traffic channel frame on the uplink.

12. The method of claim 9, wherein the TFCI signal is represented as pilot signal output symbols after the dependency on TFCI bits are removed, accumulating pilot signal output symbols further includes dividing the pilot signal into first and second segments, with equal or unequal length, and separately accumulating output symbols corresponding to the given segment, and calculating L2 norms for the accumulated pilot symbols further includes separately calculating L2 norms for the accumulated pilot symbols corresponding to the given first or second segment of the pilot signal.

13. The method of claim 1, further comprising:

determining the desired signal energy for a given path position by calculating a user energy metric for each frame of the traffic channel;

wherein the determining path positions includes, comparing the calculated user frame energy metric for each given path position to a given threshold, and reporting path positions having a user energy metric exceeding the threshold to processing circuitry within the base station receiver.

14. The method of claim 1, wherein determining the frame energy value for each given path position comprises:

accumulating first output symbols in a first given segment of a slot of the frame to output a first accumulated data signal;

accumulating second output symbols in a second given segment of a slot of the frame to output a second accumulated data signal;

calculating L2 norms for the accumulated data signals to generate a plurality of input signals;

accumulating the input signals over a given duration to generate a data part frame energy for the given path position; and wherein the path positions are determined as a function of at least the data part frame energy.

15. A method of multipath acquisition for a dedicated uplink traffic channel, comprising:

determining a desired signal energy for a given path position by calculating a user energy metric based on a descrambled and despread filtered data part of at least one traffic channel frame; and determining path positions of a received traffic channel that have the desired signal energy for processing in a base station receiver from demodulated symbols of a control part and the data part of the traffic channel that is received by the base station receiver.

16. The method of claim 15, wherein the demodulated data symbols are based on Dedicated Physical Data Channel (DPDCH) soft metric symbols obtained from a DPDCH signal that represents the data part of the traffic channel.

17. The method of claim 16, wherein the received traffic channel includes a Dedicated Physical Control Channel (DPCCH) that carries control information for use in determining the path positions of the received traffic channel that have the desired signal energy for processing in the base station receiver.

18. The method of claim 15, wherein the determining the desired signal energy is performed for each frame of the traffic channel.

19. The method of claim 18, wherein determining path positions further includes:

comparing the calculated user frame energy for each given path position to a given threshold, and reporting path positions having a user energy metric exceeding the threshold to processing circuitry within the base station receiver.

20. The method of claim 15, wherein determining the desired signal energy value for each given path position comprises:

accumulating first output symbols in a first given segment of a slot of the frame to output a first accumulated data signal;

accumulating second output symbols in a second given segment of a slot of the frame to output a second accumulated data signal;

calculating L2 norms for the accumulated data signals to generate a plurality of input signals;

accumulating the input signals over a given duration to generate a data part frame energy for the given path position; and wherein the path positions are determined as a function of at least the data part frame energy.

21. A method of calculating a user frame energy metric of a dedicated uplink traffic channel frame for multipath acquisition of one or more path positions of the frame that are received by a base station receiver, the uplink traffic channel having a plurality of slots, each given slot including data information of a Dedicated Physical Data Channel (DPDCH) and control information of a Dedicated Physical Control CHannel (DPCCH), the method comprising, for each path position at the receiver:

determining a DPDCH frame energy value based on demodulated DPDCH symbols resulting from demodulation of the received DPDCH signal and a descrambled and despread filtered DPDCH signal, determining a DPCCH frame energy value from the control information in the DPCCH, and combining the DPDCH and DPCCH energy values to generate the user frame energy metric.

22. A method of multipath acquisition for a dedicated uplink traffic channel, comprising:

calculating a user energy metric in accordance with the method of claim 5, comparing the calculated user frame energy metric for each given path position to a given threshold, and reporting path positions having a user energy metric exceeding the threshold to processing circuitry within the base station receiver.

* * * * *